United States Patent
Artes et al.

(10) Patent No.: US 9,984,558 B2
(45) Date of Patent: May 29, 2018

(54) INTERACTION BETWEEN A MOBILE ROBOT AND AN ALARM INSTALLATION

(71) Applicant: ROBART GMBH, Linz (AT)

(72) Inventors: Harold Artes, Linz (AT); Michael Schahpar, Linz (AT); Kai Iskratsch, Linz (AT)

(73) Assignee: RobArt GmbH, Linz (AT)

( * ) Notice: Subject to any disclaimer, the term of this patent is extended or adjusted under 35 U.S.C. 154(b) by 0 days. days.

(21) Appl. No.: 14/411,578

(22) PCT Filed: Jun. 25, 2013

(86) PCT No.: PCT/AT2013/050125
§ 371 (c)(1),
(2) Date: Dec. 29, 2014

(87) PCT Pub. No.: WO2014/000009
PCT Pub. Date: Jan. 3, 2014

(65) Prior Publication Data
US 2015/0170509 A1    Jun. 18, 2015

(30) Foreign Application Priority Data
Jun. 27, 2012   (DE) ........................ 10 2012 211 071

(51) Int. Cl.
*G08B 23/00*    (2006.01)
*G08B 29/18*    (2006.01)
(Continued)

(52) U.S. Cl.
CPC ........... *G08B 29/18* (2013.01); *G05D 1/0274* (2013.01); *G08B 13/00* (2013.01); *G08B 13/18* (2013.01);
(Continued)

(58) Field of Classification Search
None
See application file for complete search history.

(56) References Cited

U.S. PATENT DOCUMENTS 5,202,661 A * 4/1993 Everett, Jr. ............ G08B 13/00
340/522
5,446,445 A   8/1995 Bloomfield et al.
(Continued)

FOREIGN PATENT DOCUMENTS

DE         10355379 A1   12/2005
DE      102008040083 A1   1/2010
(Continued)

*Primary Examiner* — Brian Zimmerman
*Assistant Examiner* — Kevin Lau
(74) *Attorney, Agent, or Firm* — Laurence A. Greenberg; Werner H. Stemer; Ralph E. Locher (57) ABSTRACT

A system has a mobile robot for autonomously performing activities and a statically fitted alarm installation for monitoring an area. Accordingly, the robot and the alarm installation communicate with one another via a communication link. The mobile self-propelled robot uses a map of the environment to navigate across a floor space through at least a portion of the area and to locate its position on the map. Triggering of an alarm by the alarm installation is prevented when the robot moves into the area to be monitored. The triggering of the alarm by the alarm installation is made possible again when the robot moves out of the area to be monitored.

28 Claims, 4 Drawing Sheets

(51) Int. Cl.
  *G05D 1/02* (2006.01)
  *G08B 13/18* (2006.01)
  *G08B 13/196* (2006.01)
  *G08B 25/10* (2006.01)
  *G08B 25/14* (2006.01)
  *H04N 7/18* (2006.01)
  *G08B 13/00* (2006.01)
  *G08B 25/00* (2006.01)

(52) U.S. Cl.
  CPC . *G08B 13/19608* (2013.01); *G08B 13/19645* (2013.01); *G08B 13/19656* (2013.01); *G08B 13/19697* (2013.01); *G08B 25/008* (2013.01); *G08B 25/10* (2013.01); *G08B 25/14* (2013.01); *G08B 29/185* (2013.01); *H04N 7/181* (2013.01); *G05D 2201/0203* (2013.01)

(56) References Cited

U.S. PATENT DOCUMENTS

| | | |
|---|---|---|
| 7,091,850 B2 | 8/2006 | Katz |
| 7,283,057 B2 | 10/2007 | Kim |
| 2004/0113777 A1 | 6/2004 | Matsuhira et al. |
| 2005/0096790 A1 | 5/2005 | Tamura et al. |
| 2005/0171636 A1 | 8/2005 | Tani |
| 2009/0303042 A1* | 12/2009 | Song ............... G08B 13/19647 340/566 |
| 2011/0273293 A1* | 11/2011 | Itkin .................. G08B 13/184 340/557 |
| 2012/0265370 A1* | 10/2012 | Kim .................... G07C 5/0841 701/2 |

FOREIGN PATENT DOCUMENTS

| | | |
|---|---|---|
| DE | 102010047100 A1 | 4/2012 |
| EP | 0522200 A2 | 1/1993 |
| EP | 2423893 A1 | 2/2012 |
| GR | 1006635 B2 | 12/2009 |
| JP | H07164374 A | 6/1995 |
| JP | 2000182169 A | 6/2000 |
| JP | 2003288188 A | 10/2003 |
| JP | 2003345438 A | 12/2003 |
| JP | 2004070564 A | 3/2004 |
| JP | 2004325020 A | 11/2004 |
| JP | 2005211359 A | 8/2005 |
| WO | 2010000512 A1 | 1/2010 |

* cited by examiner

Fig. 4

INTERACTION BETWEEN A MOBILE ROBOT AND AN ALARM INSTALLATION

BACKGROUND OF THE INVENTION

Field of the Invention

The present invention relates to a method for operating a mobile (self-propelled) robot, in particular for operating a mobile robot in an area monitored by an alarm installation, and to a system and a mobile robot for using the method.

Numerous self-propelled robots, for example for cleaning or treating floor spaces, for transporting objects or for inspecting an environment, are known and are commercially available. Such robots can be used both in the private sector and in the commercial sector. Alarm installations which are intended to detect intrusion of undesirable persons (for example in buildings or premises) are likewise used both in the private sector and in the commercial sector. If the undesirable intrusion is detected, corresponding actions are generally triggered. For example, an alarm can be triggered, security forces can be alerted, doors can be locked, etc. The intrusion of undesirable persons is detected, inter alia, using sensors which detect movements in an area to be protected. Other sensors are also known for the same purpose, for example tread sensors, heat sensors, cameras, light barriers, etc.

Autonomously operating mobile robots in commercial use typically perform their activities outside the operating hours and, in the private sector, in the absence of the owners in order to avoid causing disturbances during daily operation. Therefore, their times of use often coincide with the times of use of the alarm installations. Consequently, false alarms are produced in such situations if the alarm installation registers the movements of the robot and incorrectly identifies the robot as an intruder.

Systems are known in which a possible false alarm cannot be triggered by the robot since the robots themselves are used as the alarm system and trigger intrusion, fire or hazard alarms. EP 0 522 200 B1 describes, for example, a robot which randomly moves around, is provided with various sensors and can therefore detect unusual states, for example fire or the intrusion of persons. If such a state is detected, this is transmitted to a central monitoring unit by cable or radio. U.S. Pat. No. 7,283,057 B2 discloses a cleaning robot which can detect smoke and can trigger a fire alarm. In these cases, the robot itself is as it were the alarm installation and the problem described at the outset does not occur.

US 2009/303042 A1 discloses a system in which the permanently installed alarm system and the robot communicate with one another. If the stationary sensors detect an irregularity, the mobile robot moves to the corresponding location and can produce images of the environment there, for example. When approaching the location, the robot is oriented by the strength of RF (radio frequency) signals, a multiplicity of wireless sensor nodes and by estimating the distance covered and the orientation of the robot. In this case too, the robot can be considered to be part of the alarm installation which additionally monitors those regions in which an irregularity was detected by other sensors.

U.S. Pat. No. 5,202,661 A describes a system in which the signals from alarm sensors on the robot and the signals from stationary sensors are transmitted to a computer. The computer uses mathematical models and the comparison with a reference value to calculate whether the robot has been detected by the stationary sensors and whether an alarm must be triggered. In this case too, the robot is part of the alarm installation.

BRIEF SUMMARY OF THE INVENTION

The object on which the invention is based is to provide an improved method and system for avoiding false alarms triggered by mobile robots.

This object mentioned is achieved by means of a system for operating a mobile robot and a method according to the independent claims. The dependent claims relate to different examples and further developments of the invention.

A system comprising a mobile robot for autonomously performing activities and a statically fitted alarm installation for monitoring an area is described. According to one aspect of the invention, the robot and the alarm installation are designed to communicate with one another via a communication link. The mobile self-propelled robot is designed to use a map of the environment to navigate across a floor space through at least a portion of the area and to locate its position on the map. Triggering of an alarm by the alarm installation is prevented when the robot moves into the area to be monitored. The triggering of the alarm by the alarm installation is enabled again when the robot moves out of the area to be monitored.

A method for operating a mobile self-propelled robot for autonomously performing activities in an area monitored by an alarm installation is also described. According to another aspect of the invention, the method comprises storing and managing at least one map of the environment, the monitored area being at least partially included in the map. The robot navigates across the floor space using the stored map of the environment, triggering of an alarm by the alarm installation being prevented when the robot moves into the area to be monitored; and triggering of an alarm by the alarm installation being enabled (again) when the robot moves out of the area to be monitored.

A mobile robot for autonomously performing activities is also described. According to another aspect of the invention, the robot has the following: a drive module for moving the robot across the floor space; a treatment module for performing the activities during a treatment process; at least one sensor module for acquiring information relating to the environment and/or relating to the floor space; a navigation module which is designed to navigate the robot across the floor space using a map of the environment; and a communication module which is designed to communicate with an alarm installation and/or a monitoring unit, the alarm installation being designed to monitor an area, and the robot being designed to store the area to be monitored inside the map. The robot is also designed to transmit a message to deactivate or ignore an alarm to the alarm installation and/or the monitoring unit when it detects from the maps that it is moving into the area to be monitored; and to transmit a message to activate or heed an alarm (again) to the alarm installation and/or the monitoring unit when it detects from the maps that it is moving out of the area to be monitored.

BRIEF DESCRIPTION OF THE SEVERAL VIEWS OF THE DRAWING

The following figures and the further description are intended to help to improve understanding of the invention. The elements in the figures should not necessarily be understood as meaning a restriction; rather, importance is placed on describing the principle of the invention. In the figures, identical reference symbols denote identical or similar components or signals with an identical or similar meaning. In the figures.

DESCRIPTION OF THE INVENTION

The examples and technical features of the mobile robot which are described in connection with the treatment of a floor space can also be applied to a mobile robot for performing other activities or additional activities. The activities performed by the mobile robot described may also comprise, for example, the treatment of floor spaces, the inspection of the floor space or the environment, the transport of objects, the cleaning of air and/or the performance of entertainment games. A treatment module is not necessarily required, for example, when the robot is solely used for inspection.

Figure 1:
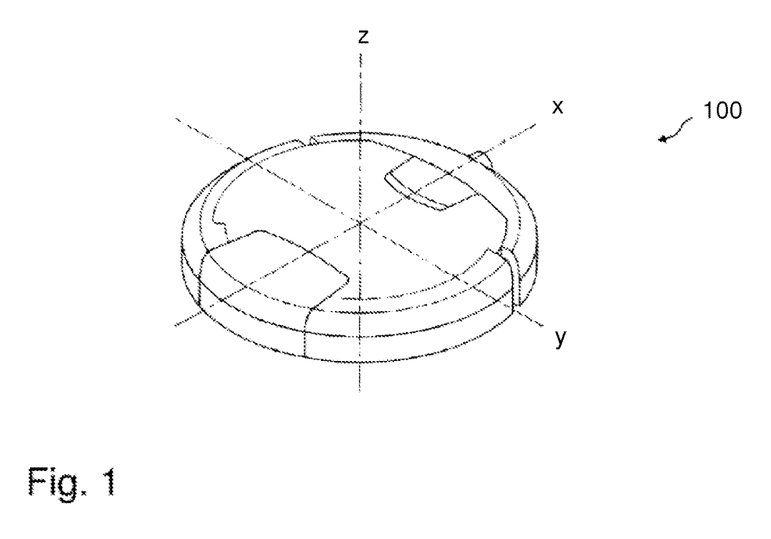
FIG. 1 shows, by way of example, a schematic isometric illustration of a self-propelled robot for autonomously cleaning floor spaces.

FIG. 1 shows, by way of example, a schematic isometric illustration of a self-propelled robot 100 for autonomously cleaning floor spaces. FIG. 1 also shows a Cartesian coordinate system with the origin in the center of the robot 100. Such devices are often—but not necessarily—in the form of a disk. The vertical axis z passes through the center of the disk. The longitudinal axis is denoted with x and the transverse axis is denoted with y.

The robot 100 comprises a drive module (not illustrated) which may have electric motors, gears and wheels, for example. The drive module may be designed, for example, to move the robot in the forward and reverse directions (this would be along the x axis in the illustration from FIG. 1) and to rotate the robot about the vertical axis (this would be the z axis in the illustration from FIG. 1). Therefore, the robot can—theoretically—approach any point of a floor space (which is parallel to the plane defined by the x axis and y axis). The robot also comprises a treatment module, for example a cleaning module, which is designed to clean the floor space under (and/or beside) the robot. For example, dust and dirt particles are drawn into a collection container or conveyed into the latter in a mechanical (or any other) manner. Such robots are known as such.

The robots are used both in the private sector and in the commercial sector. However, alarm installations which are intended to detect intrusion of undesirable persons, for example in buildings or on premises, are also often used in the private sector and in the commercial sector. If the undesirable intrusion is detected, corresponding actions are generally triggered. For example, an alarm is triggered or security forces are alerted. The intrusion of undesirable persons is often detected, inter alia, using sensors, for example cameras, which detect movements in an area to be protected. Alarm installations which comprise, as an additional or alternative function, the detection of fires or other irregularities in the area to be monitored are often also used.

Autonomous mobile robots in commercial use typically perform their activities outside the operating hours and, in the private sector, in the absence of the owners in order to avoid causing disturbances during daily operation. Therefore, their times of use often coincide with the times of use of the alarm installations and false alarms may be produced if the alarm installation registers the movements of the robot and incorrectly identifies the robot as an intruder.

Figure 2:
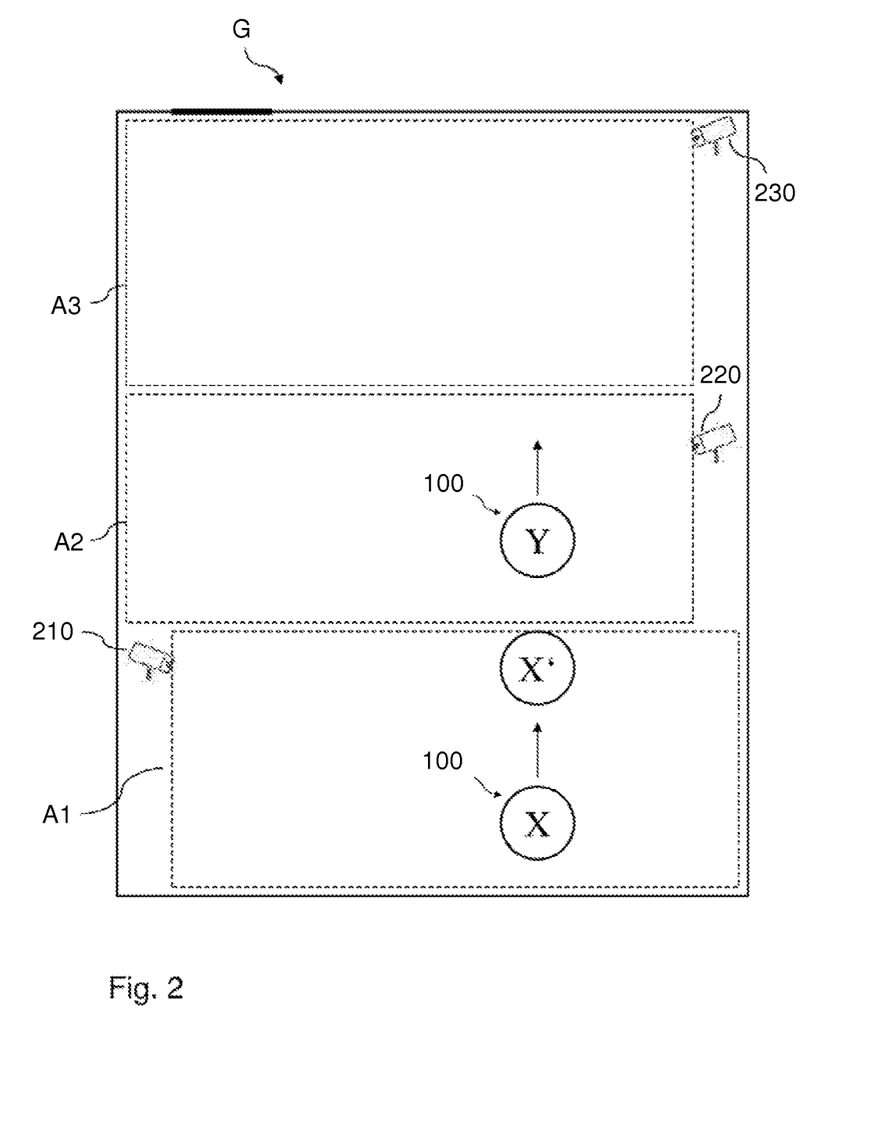
FIG. 2 shows an exemplary illustration of a self-propelled robot for autonomously cleaning floor spaces at different positions in an area to be cleaned with a plurality of sensor components.

FIG. 2 shows, by way of example, an area G which is to be monitored by an alarm installation and here simultaneously constitutes the area to be treated by a mobile robot 100. In other cases, the area G to be monitored may also be smaller or larger than the area to be treated by the robot 100. The alarm installation has three sensor components 210, 220 and 230 which each monitor a different region of the entire area G to be monitored. For example, the sensor component 210 monitors the region A1, the sensor component 220 monitors the region A2 and the sensor component 230 monitors the region A3. The sensor components 210, 220 and 230 are illustrated as cameras, by way of example. They may also be, for example, other sensors, for example sensors for optically detecting objects, or any other type of sensors, depending on what the area G is intended to be monitored for.

An alarm installation may have only one sensor component up to a multiplicity of sensor components 210, 220, 230 in an area G to be monitored. In FIG. 2, each of the sensor components 210, 220, 230 illustrated monitors its own region A1, A2, A3 of the entire area G. However, a region A1, A2, A3 could also be monitored by a plurality of sensor components. The regions A1, A2, A3 could also partially overlap in order to avoid blind spots, for example.

If the robot 100 is at the position X in the region A1, for example, it is detected by the sensor component 210. In contrast, the sensor components 220 and 230 are oriented in such a manner that they cannot detect the robot 100 at the position X. If the robot 100 moves forward during a treatment process in the area G and is then at the position Y, for example, it is situated in the region A2 and is therefore now detected by the sensor component 220. During a treatment process, the robot 100 is situated in each of the regions A1, A2 and A3 at least once in the example shown and is detected by the respective sensor component 210, 220, 230. In this case, the situation may occur in which a sensor component 210, 220, 230 incorrectly identifies the robot 100 as an unwanted intruder. An alarm may then be triggered or a security person may be alerted, for example.

However, such false alarms are undesirable. For this reason, the system according to the invention provides for the robot 100 and the alarm installation to communicate and/or interact with one another in order to avoid false alarms.

In the system according to the invention, a map of the area to be cleaned can be created and the corresponding position of the robot 100 on this map can be determined at the same time. Such methods are known and are referred to as SLAM methods (Simultaneous Localization and Mapping, see, for example, H. Durrant-Whyte and T. Bailey: "Simultaneous Localization and Mapping (SLAM): Part I The Essential Algorithms" in: IEEE Robotics and Automation Magazine, Vol. 13, No. 2, pages 99-110, June 2006). This enables targeted navigation. The map and the position of the robot 100 on the map can be determined in this case using one or more sensors.

Since the maps created by the robot 100 are permanently stored and are reused for subsequent cleaning processes, there is no need to repeatedly explore the environment, on the one hand, and the positions of the sensor components 210, 220, 230 of the alarm installation can be stored in the maps, on the other hand. In this case, the positions of the sensor components 210, 220, 230 may be detected by corresponding sensors in the robot 100, for example. However, it is also possible, for example, for the alarm installation to send the robot 100 information relating to which sensor components respectively respond to the robot 100 during a treatment process. A learning phase of the robot 100 could be provided for this purpose, for example, during which learning phase the robot covers the entire area G and enters the sensor components 210, 220, 230 and the respectively monitored region A1, A2, A3 in the maps. In this case, it may be important to cover the relevant area G in an uninterrupted manner since some sensors do not cover contiguous regions on account of reflections, for example. A further possibility is for the positions of the sensor components 210, 220, 230 to be manually entered in the maps by a user input.

In addition, the robot 100 can determine and reuse map-based information during a learning phase or during each treatment process. For example, heavily soiled regions can be marked on the map and can be given special treatment in a subsequent cleaning process.

The maps may also be made available to a user, for example. This makes it possible to check, for example, whether the determined regions A1, A2, A3 have been correctly entered. The user could also add missing regions or correct incorrectly entered regions. User-specific information, for example room names, may also be adopted.

If the sensor components 210, 220, 230 and the regions A1, A2, A3 monitored by them are entered in the map, the sensor components triggered by the movement of the robot 100 can be deliberately ignored or the sensor components can be deactivated before being triggered by the robot 100, for example by means of deliberate requests to the alarm installation from the robot. If the robot 100 moves, for example, from the position X to the position Y via the position X', it uses the maps to determine that it changes from the region A1 to the region A2 at the position X'. The robot could then transmit a request to the alarm installation to deactivate or ignore the sensor component 220 even before the robot changes to the region A2. At the same time, when the robot leaves the region A1, the sensor component 210 can be activated or heeded again when this sensor component was previously deactivated or ignored.

In this case, a corresponding sensor component 210, 220, 230 can be deactivated or ignored even before the robot 100 is in the corresponding region A1, A2, A3. However, a sensor component 210, 220, 230 could also be deactivated or ignored only when the robot is already in the correspondingly monitored region A1, A2, A3 and has been detected. In such a case, the alarm installation could first of all transmit a query to the robot 100 in order to determine whether the actual position of the robot 100 and the position detected by the sensor component 210, 220, 230 match in order to distinguish between a desired alarm and a false alarm triggered by the robot 100.

Figure 3:
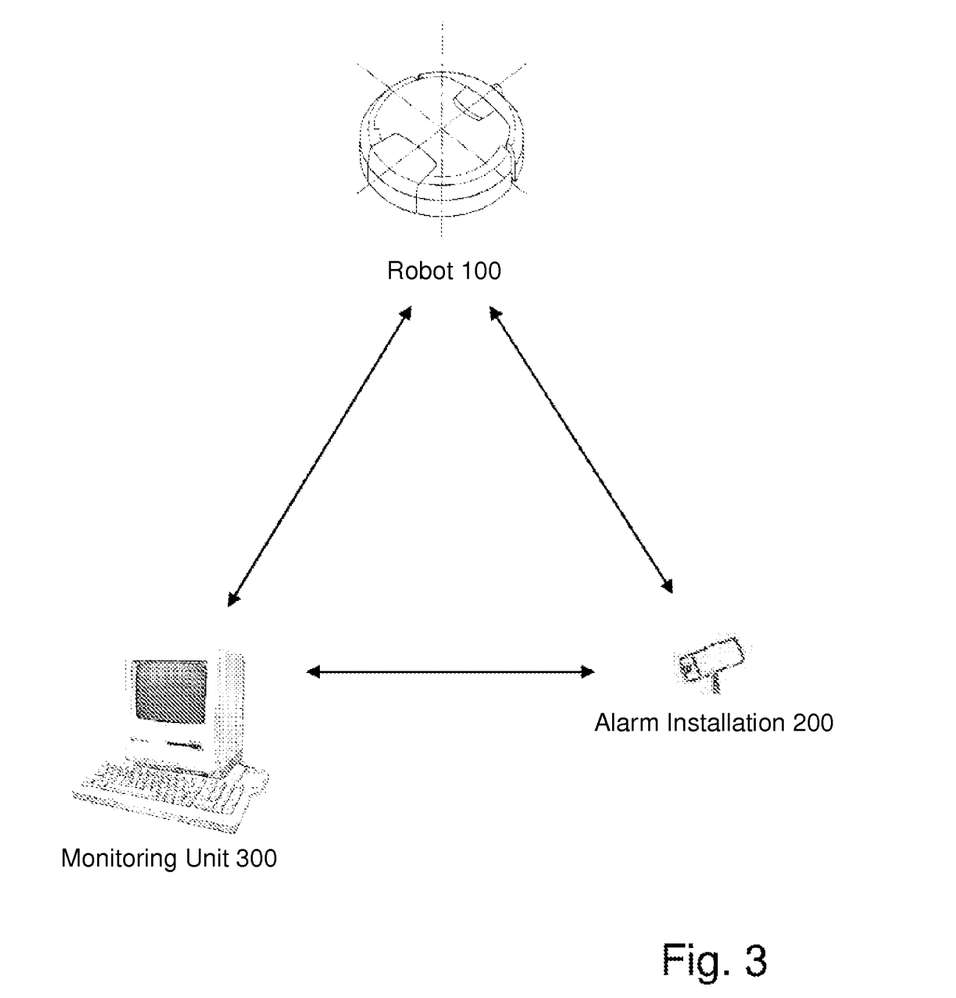
FIG. 3 shows, by way of example, a system according to the invention.

As shown in FIG. 3, the system according to the invention could also have an additional external unit in addition to the robot 100 and an alarm installation 200. This could be a monitoring unit 300, for example. The monitoring unit 300 could receive, for example, information relating to the robot's current position and/or its calculated route through the area G from the robot 100 as well as information relating to respectively responding sensor components 210, 220, 230 from the alarm installation 200 and could manage said information. Instead of the robot 100, the monitoring unit 300 could then transmit requests to deactivate or ignore components to the alarm installation 200. However, these functions could likewise be undertaken by the alarm installation 200 or the robot 100 itself and the monitoring unit 300 could be integrated as it were in the alarm installation 200 or the robot 100. The maps with the corresponding entries may also be stored in the robot 100, in the alarm installation 200 or, if present, in the monitoring unit 300. The monitoring unit 300 is optional in the system according to the invention.

Figure 4:
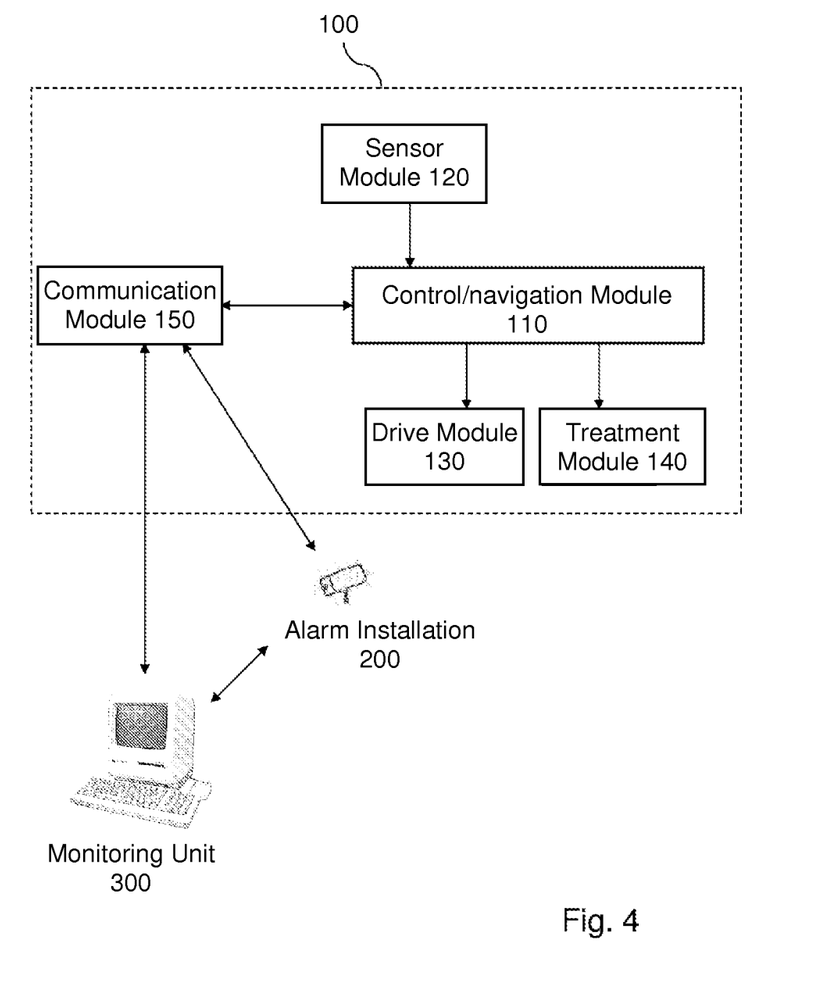
FIG. 4 shows, by way of example, a block diagram of a robot according to the invention in one embodiment of the system according to the invention.

FIG. 4 likewise shows, by way of example, the system according to the invention having a robot 100, an alarm installation 200 and a monitoring unit 300, in which case the schematic structure of a robot 100 according to the invention for autonomously treating (for example cleaning) floor spaces is illustrated by way of example in a block diagram.

A drive module 130 and a treatment module 140 which have already been mentioned above are illustrated. Both modules 130 and 140 are controlled by a navigation and control module 110. The navigation module 110 is designed to navigate the robot across the floor space during a cleaning process using a map of the environment. In this case, the map may be stored in a memory of the navigation and control module 110, in the alarm installation 200 or in the monitoring unit 300 in the form of map data. If the map is stored, for example, in the alarm installation 200 or in the monitoring unit 300, the navigation module 110 can access the map using a communication module 150.

The robot 100 could not only retrieve map data from the alarm installation 200 and/or the monitoring unit 300 via the communication module 150. The entire communication and interaction with the alarm installation 200 and/or the monitoring unit 300 can take place via the communication module 150, and so the requests to deactivate or ignore components 210, 220, 230 of the alarm installation 200 can also be transmitted via the communication module 150.

Since communication between the robot 100 and the alarm installation 200 and/or the monitoring unit 300 is a security-critical aspect, a secure communication interface must be used. The transmitted data could be encrypted, for example. SSL encryption (Secure Socket Layer encryption) would be possible for this, for example. An asymmetrically encrypted connection could also be established using keys or certificates which cannot be read and are stored in the hardware. Furthermore, message IDs could be used as verification in order to avoid playback attacks, for example. Playback attacks are attacks using recorded messages from the robot 100 which are played back again at a subsequent time in order to deactivate the alarm installation 200 in certain regions A1, A2, A3. Message IDs contained in the encrypted message might have to obey a certain sequence. An alarm could be triggered, for example, in the case of incorrectly transmitted IDs. Said encryption methods and various other encryption methods are generally known and shall therefore not be explained in any more detail.

The robot 100 also comprises a sensor module 120 for acquiring information relating to the structure of the environment and/or relating to properties of the floor space. For this purpose, the sensor module 120 may have one or more sensor units which are designed to acquire information, on the basis of which a map of the environment can be constructed and the position of the robot on the map can be located. Sensors which are suitable for this purpose are, for example, laser range scanners, cameras, triangulation sensors, contact sensors for detecting a collision with an obstacle, etc. As already described, a SLAM method can be used to construct the map and to simultaneously determine the position of the robot inside the map. The sensor module 120 can also identify or detect, for example, sensor components 210, 220, 230 of the alarm installation 200 which can then be accordingly entered in the map.

The sensor units may also be used, for example, to detect any possible irregularities in the area to be cleaned. In this case, irregularities may be, for example, foreign objects, persons, smoke or fire. The robot 100 could therefore be used as a mobile part of the alarm installation 200 and could itself detect, for example, foreign objects or movements using optical sensors, for example. However, it would also be conceivable, for example, for the sensor module 120 to comprise thermal imaging cameras or sensors with a similar function. If one of the sensors is triggered, this can be transmitted to the alarm installation which can then initiate corresponding actions.

Contact sensors in the sensor module 120 may detect a collision, for example, and current sensors for measuring the load current of the drive unit can be used, for example, to detect when the robot is stuck (for example on the fringes of a rug). Other sensor units may detect sticking of the robot, for example, by the spinning of the drive wheels. It is possible to provide further sensor units which are designed, for example, to determine the degree of soiling of the floor. The acquired environmental information can be transmitted to the navigation and control module 110 together with a position of the robot on the map, which position is associated with the respective information.

If the robot 100, for example, is provided with an item of information relating to whether or not the alarm installation is active, different cleaning modes can be implemented, for example. An unrestricted cleaning mode could be carried out, for example, only when the alarm installation 200 is active and therefore no more persons are assumed to be in the area to be cleaned. If the alarm installation 200 is not active, that is to say persons are still assumed to be in the area G, only a restricted cleaning mode could be carried out, in which only little-frequented regions of the area G are cleaned, for example. Little-frequented regions can be identified, for example, with the aid of the available sensor components 210, 220, 230. This may also be possible, for example, when the alarm installation 200 is not switched on or is not "armed". Such regions could again be entered in the stored maps.

If the robot 100 receives the information that the alarm installation has now been switched on from the alarm installation 200, the robot 100 can begin the treatment process either directly or only after the expiry of an adjustable timer. In addition, the robot 100 could interrupt a treatment process which has begun or could change to another treatment mode if it receives an item of information relating to the deactivation of the alarm installation from the alarm installation 200.

It would also be possible for the robot 100 to be sent to a particular region by the alarm installation 200. If the alarm installation 200 detects irregularities in the region A1, for example, the robot 100 can be sent into the alarm zone in order to take photographs of the environment there, for example. For example, images or videos could be recorded. These could be transmitted to emergency services so that the latter can get an idea of the alarm zone in advance. The permanent storage of the maps is advantageous in this case since quick and reliable approach by the robot 100 is enabled.

Different advantages emerge in systems in which the robot 100 itself combines and manages the information relating to its position and the alarm sensors responding at this position. For example, the robot 100 can be used when setting up the alarm installation 200. It could be ensured, for example, that the entire area G is covered with a desired overlapping of the regions A1, A2, A3 with the smallest possible number of sensor components 210, 220, 230. In this case, the robot 100 can automatically create a map of the coverage. This map can then be manually checked. Furthermore, since the robot itself knows its planned future movements, the robot 100 can deactivate regions or sensor components in an anticipatory manner by transmitting corresponding requests to the alarm installation 200.

However, advantages also result if the alarm installation 200 manages the position of the robot 100 and the regions responding thereto. The alarm installation 200 therefore always retains sovereignty over the security-relevant system. The alarm installation 200 may check the information received from the robot 100 for consistency and can therefore preempt electronic intrusion attempts, for example.

An electronic intrusion attempt might take place, for example, if an intruder uses a device which manages to communicate with the alarm installation 200 and in the process pretends to be the robot 100. In this manner, an intruder could attempt to switch off any desired components 210, 220, 230. The alarm installation 200 could counteract this if it checks received requests for logical consistency. For example, the requests could not be allowed if particular rules are not complied with. For example, a minimum residence time of the robot 100 in particular regions A1, A2, A3 could be required. However, only a particular maximum number of sensor components 210, 220, 230 beside one another could also be able to be deactivated at the same time, for example. Such logic checks can be considerably simplified by means of the information relating to the robot position and the map containing the entered monitoring regions A1, A2, A3 of the sensor components 210, 220, 230.

Instead of being carried out by the robot 100 or the alarm installation 200, tasks can also be undertaken by a monitoring unit 300 if such a monitoring unit is provided in the system.

In order to reliably avoid false alarms, additional sensors which do not respond to the robot 100 could also be used for the alarm installation 200. In this case, physical differences between a person and the robot 100 could be used, for example. For example, it would be possible to use sensors which can measure the temperature of the object and trigger an alarm only in the event of temperatures which are close enough to the human body temperature. However, it would also be possible to use, for example, sensors which can detect the shape of the robot 100.

The function of a robot 100 according to the invention for autonomously treating floor spaces and of a system according to the invention is explained in more detail below using three case examples.

First example: a company uses one or else more cleaning robots 100 to clean its production halls. The halls are protected using an alarm installation 200. In this case, the alarm installation 200 comprises a plurality of sensor components 210, 220, 230 and subdivides the halls into a plurality of regions A1, A2, A3 in this case. After exploring the space to be cleaned for the first time, the robot 100 has a map in which it can locate itself. The alarm installation 200 has a module for communicating with the robot 100. Via this interface, the robot 100 can register with the alarm installation 200 and can communicate with the latter. In this case, information relating to positions of the sensor components 210, 220, 230 and their detection region A1, A2, A3 can also be interchanged, which information is entered in the map by the robot 100.

The robot can use the map information to adapt its cleaning strategy to the regions A1, A2, A3 in order to minimize the transitions between different regions. Whenever the robot 100 enters the region of a new sensor component, the robot 100 initiates communication with the alarm installation 200 even before entering the corresponding region. In this case, the information indicating that the robot 100 is now entering this region is transmitted to the alarm installation 200. The alarm installation 200 can then store the current alarm status of the corresponding sensor component and can deactivate or ignore the latter if necessary. After completion, the alarm installation 200 transmits a message to the robot 100, in which it communicates the fact that the region can now be traveled through. The robot waits for this response in front of the boundary and can continue its journey only in the event of a positive response.

If the robot 100 is not supposed to travel through a particular region at a given time for reasons which are not specified any further, the alarm installation 200 can also transmit a negative response to the robot 100. The robot 100 is thereby caused to change its planning and to travel through this region only at a later time or to not clean it at all.

If an alarm zone region is left again, the robot 100 again transmits the corresponding information to the alarm installation 200 so that the alarm status of this region can be restored.

Second example: a cleaning robot 100 explores a house to be cleaned and in the process creates a map in which it can locate itself. The alarm installation 200 installed in the house has a communication module 150 which can be used to establish a secure encrypted connection to the robot 100. The system additionally has special software which can be used to create a map and test the alarm regions in cooperation between the alarm installation 200 and the robot 100.

During subsequent treatment processes, the robot 100 must regularly transmit its position coordinates and the next waypoint to the alarm installation 200 during its route. In this manner, whenever a sensor component responds, the alarm installation 200 can compare the position and the planned route of the robot 100 with the triggered alarm. In the event of a corresponding match, the alarm installation 200 can assume with sufficient certainty that the robot 100 triggered the alarm and no further actions need to be initiated. If there is no match, an alarm can be triggered and/or a relevant person can be informed, for example.

Third example: a company protects its premises with an alarm installation 200. It also has a robot 100 which can create a map and can navigate with the aid of this map. The alarm installation 200 and the robot 100 can communicate with one another. This can be implemented either directly or with additional modules.

If an alarm is triggered, the alarm installation 200 can send the robot 100 to a position from which the robot 100 can observe the area around the sensor which has been triggered. The robot 100 can record images, videos or additional sensor data, for example. These data can then be transmitted to the alarm installation 200 in order to provide emergency services with additional information. In this case, the robot 100 could also be used to interact with the perpetrator. For example, an intruder could be requested to leave the region or the building. A request to input a code could also be output. Authorized persons, for example, who have been incorrectly identified as intruders could therefore switch off the alarm by inputting a code.

In particular, when a plurality of robots 100 are used in an area G, the robots 100 could be coordinated so as to prevent a possible intruder from escaping.

It goes without saying that this method could also be used with other types of alarms, for example a fire alarm, in order to determine whether there is actually a fire or whether a false alarm has been triggered. Further special sensors, for example smoke and gas sensors, could be used especially when the method is used for fire alarms. It would also be possible to implement corresponding sensors which can detect persons in a manner other than by means of movements. Injured persons could therefore be detected, for example. It would therefore be possible to provide the fire department with better information in the event of a fire. The robot could also attempt to make contact with persons in order to determine whether they are conscious.

The examples and technical features of the mobile robot which are described in connection with the treatment of a floor space can also be applied to a mobile robot for performing other activities. All activities which can be undertaken by autonomous self-propelled robots are conceivable in this case. These activities may comprise, for example, the inspection of the floor space or the environment, the transport of objects, the cleaning of air and/or the performance of entertainment games. The treatment module 140 described is designed accordingly in robots which perform activities other than the treatment of floors or perform additional activities. In some cases, a treatment module 140 is not required, for example, when the robot is solely used to monitor or inspect rooms, spaces or objects.

Whereas the invention was described using an exemplary refinement, the invention can accordingly be additionally modified within the basic concept and scope of protection of this disclosure. The present application is therefore intended to cover numerous variants, possible uses or adaptations of the invention using its fundamental principles. In addition, the present application is intended to cover those deviations from the present disclosure which constitute known or conventional practice in the prior art on which the present invention is based. The invention is not restricted to the details stated above, but rather can be modified according to the accompanying claims.

The invention claimed is:

1. A system, comprising:
a statically fitted alarm installation configured to monitor an area;
an autonomous mobile robot configured to autonomously perform activities, said autonomous mobile robot having a map of an environment to navigate, using the map, across a floor space through at least a portion of the area to be monitored and to locate a position of itself on the map, wherein the map including information about a location of the area to be monitored and said autonomous mobile robot being further configured to detect, whether said autonomous mobile robot is moving into the area to be monitored or out of the area to be monitored based on information representing the position of said autonomous mobile robot on the map;
a communication link, said autonomous mobile robot and said statically fitted alarm installation communicate with one another via said communication link;
wherein the system is configured to prevent said statically fitted alarm installation from triggering an alarm when said autonomous mobile robot moves into the area to be monitored and the system is further configured to enable the triggering of the alarm by said statically fitted alarm installation when said autonomous mobile robot moves out of the area to be monitored; and wherein the triggering of the alarm is prevented by said autonomous mobile robot communicating to said statically fitted alarm installation, via said communication link, that it is about to move into the area to be monitored, for which said autonomous mobile robot has detected that it is about to move into.

2. The system according to claim 1, wherein said statically fitted alarm installation has at least one sensor component for monitoring the area entirely or at least the portion of the area.

3. The system according to claim 2, wherein said at least one sensor component is deactivated or ignored in order to prevent triggering of the alarm when said autonomous mobile robot moves into the portion monitored by said at least one sensor component.

4. The system according to claim 3, wherein said at least one sensor component is activated or heeded again to enable triggering of the alarm again when said autonomous mobile robot moves out of the portion monitored by said at least one sensor component.

5. The system according to claim 2, wherein said at least one sensor component is selected from the group consisting of a camera, a motion detector, a light barrier and a safety mat.

6. The system according to claim 1, wherein said autonomous mobile robot is configured to autonomously perform activities while navigating through at least the portion of the area.

7. The system according to claim 1, wherein said autonomous mobile robot and said statically fitted alarm installation communicate with one another via at least one encrypted communication channels.

8. The system according to claim 1, further comprising a monitoring unit that is configured to communicate with at least one of said autonomous mobile robot or said statically fitted alarm installation.

9. The system according to claim 8, wherein said autonomous mobile robot has a navigation computer and maps are stored in at least one of said statically fitted alarm installation, said monitoring unit or said navigation computer.

10. The system according to claim 9, wherein the maps are created during a learning trip of said autonomous mobile robot, during which said autonomous mobile robot moves across the area to be monitored and creates the map in the process.

11. The system according to claim 2, wherein:
said at least one sensor component is one of a plurality of sensor components; and
said autonomous mobile robot detects said sensor components fitted in the area to be monitored and portions monitored by said sensor components and enters them in the map.

12. The system according to claim 2, wherein the alarm is triggered, when said at least one sensor component detects a foreign object, at least one person, smoke, fire or another disturbance in at least one portion of the area in which said autonomous mobile robot is not situated.

13. The system according to claim 12, wherein said autonomous mobile robot uses stored maps to navigate to the at least one portion in which the alarm was triggered.

14. The system according to claim 2, wherein said autonomous mobile robot performs activities depending on a state of at least one of said statically fitted alarm installation and said at least one sensor component.

15. The system according to claim 1, wherein the system is configured to detect portions of the area to be monitored in which there are no or only a few persons.

16. The system according to claim 15, wherein the system allows said autonomous mobile robot to navigate only to the portions in which there are no or only a few persons.

17. The system according claim 1, wherein said autonomous mobile robot concludes its activities in one portion of the area to be monitored before it navigates to a next portion of the area to be monitored.

18. The system according to claim 1, wherein said autonomous mobile robot can autonomously perform activities during navigation including a treatment or cleaning of floor spaces, an inspection of an environment or of objects in the environment, a transport of objects or a cleaning of air.

19. A method for operating an autonomous mobile robot for autonomously performing activities in an area monitored by a statically fitted alarm installation, which comprises the following steps of:
storing at least one map of an environment, the map including information about a location of the area to be monitored;
navigating the autonomous mobile robot across a floor space of the area using the map of the environment while performing the activities;
detecting, based on information representing a position of the autonomous mobile robot on the map, whether the autonomous mobile robot moves into the area to be monitored or a specific portion of the area or whether the autonomous mobile robot moves out of the area to be monitored or, respectively, the specific portion;
preventing a triggering of an alarm by the statically fitted alarm installation, when it is detected, based on information representing the position of said autonomous mobile robot on the map, that the autonomous mobile robot moves into the area to be monitored, wherein the step of preventing the triggering of the alarm includes that the autonomous mobile robot communicates to the statically fitted alarm installation, via a communication link, that the autonomous mobile robot is about to move into the area to be monitored for which the autonomous mobile robot has detected that it is about to move into; and
enabling the triggering of the alarm again by the statically fitted alarm installation when it is detected, based on the information representing the position of said autonomous mobile robot on the map, that the autonomous mobile robot moves out of the area to be monitored.

20. An autonomous mobile robot for autonomously performing activities, the mobile robot comprising:
a drive for moving the autonomous mobile robot across a floor space;
a treatment module for performing activities during a treatment process while the autonomous mobile robot moves across the floor space;
at least one sensor for acquiring information relating to an environment and/or relating to the floor space;
a navigation computer for navigating the autonomous mobile robot across the floor space using a map of the environment;
a communication link communicating with at least one of a statically fitted alarm installation or a monitoring unit, the statically fitted alarm installation being configured to monitor an area;
the autonomous mobile robot programmed to:

store information about a location of the area to be monitored inside the map;

detect, based on information representing a position of the autonomous mobile robot on the map, whether the autonomous mobile robot moves into the area to be monitored or a specific portion of the area or whether the autonomous mobile robot moves out of the area to be monitored or, respectively, the specific portion;

communicate to at least one of the statically fitted alarm installation or the monitoring unit, via said communication link, that the autonomous mobile robot is about to move into the area to be monitored, for which the autonomous mobile robot has detected that it is about to move into;

communicate with at least one of the statically fitted alarm installation or the monitoring unit by the further steps of:

transmitting a request to deactivate or ignore the statically fitted alarm installation to the statically fitted alarm installation and/or the monitoring unit, when the autonomous mobile robot detects, based on the information representing the position of the autonomous mobile robot on the map, that the autonomous mobile robot is moving into the area to be monitored; and transmitting a request to activate or heed the statically fitted alarm installation again to the statically fitted alarm installation and/or the monitoring unit when the autonomous mobile robot detects, based on the information representing the position of the autonomous mobile robot on the map, that the autonomous mobile robot is moving out of the area to be monitored.

21. The method according to claim 19, wherein the statically fitted alarm installation includes at least one sensor, the sensor monitoring a detection region of an area associated with the sensor, the method further comprises:

receiving, by the autonomous mobile robot, information about positions of specific detection regions via a communication link and storing received information in the map.

22. A method for operating an autonomous mobile robot for autonomously performing activities in an area monitored by a statically fitted alarm installation, which comprises the following steps of:

storing at least one map of an environment, the map including information about a location of the area to be monitored;

navigating the autonomous mobile robot across a floor space of the area using the map of the environment while performing the activities;

detecting, based on information representing a position of the autonomous mobile robot on the map, whether the autonomous mobile robot moves into the area to be monitored or a specific portion of the area or whether the autonomous mobile robot moves out of the area to be monitored or, respectively, the specific portion;

preventing a triggering of an alarm by the statically fitted alarm installation, when it is detected that the autonomous mobile robot moves into the area to be monitored, wherein the autonomous mobile robot communicating, via a communication link, that the autonomous mobile robot is about to enter a specific detection region, wherein the step of preventing the triggering of the alarm further includes the autonomous mobile robot receiving, via the communication link, a confirmation that the alarm will not be triggered when entering the specific detection region; and enabling the triggering of the alarm again by the statically fitted alarm installation when it is detected that the autonomous mobile robot moves out of the area to be monitored.

23. The method according to claim 19, wherein enabling the triggering of the alarm further includes the autonomous mobile robot communicating, via the communication link, that the autonomous mobile robot is leaving the specific detection region or is about to enter another specific detection region.

24. The system according to claim 11, wherein the map is created during a learning trip of the autonomous mobile robot, during which the autonomous mobile robot moves across the area to be monitored and creates the map in the process.

25. The system according to claim 24, wherein said statically fitted alarm installation sends information to said autonomous mobile robot about which of said sensor components is triggered during the learning trip and wherein triggered sensor components and/or the portions of the area associated therewith are stored in the map.

26. The system of claim 2, wherein:

said autonomous mobile robot communicates to said statically fitted alarm installation, via said communication link, when said autonomous mobile robot enters a monitored portion of the area, upon which said at least one sensor component is deactivated or ignored in order to prevent the triggering of the alarm; and said autonomous mobile robot communicates to the statically fitted alarm installation, via said communication link, when said autonomous mobile robot leaves the monitored portion of the area, upon which said at least one sensor activated or heeded again to enable triggering of the alarm.

27. The system according to claim 11, wherein said sensor components fitted in the area to be monitored and the portions monitored by said sensor components are manually entered in the maps by a user.

28. A system, comprising:

a statically fitted alarm installation configured to monitor an area;

an autonomous mobile robot configured to autonomously perform activities, said autonomous mobile robot having a map of an environment to navigate, using the map, across a floor space through at least a portion of the area to be monitored and to locate a position of itself on the map, wherein the map including information about a location of the area to be monitored, and said autonomous mobile robot being further configured to detect, whether said autonomous mobile robot is moving into the area to be monitored or out of the area to be monitored based on information representing the position of said autonomous mobile robot on the map;

a communication link, said autonomous mobile robot and said statically fitted alarm installation communicate with one another via said communication link;

wherein the system is configured to prevent said statically fitted alarm installation from triggering an alarm when said autonomous mobile robot moves into the area to be monitored and the system is further configured to enable the triggering of the alarm by said statically fitted alarm installation when said autonomous mobile robot moves out of the area to be monitored; and wherein said statically fitted alarm installation having at least one sensor component for monitoring the area entirely or at least the portion of the area;

wherein the map being created during a learning trip of the autonomous mobile robot, during which the autonomous mobile robot moves across the area to be monitored and creates the map in the process; and wherein during the learning trip the position of said at least one sensor component and/or the monitored portion of the area associated therewith are detected and stored in the map.

* * * * *